UNITED STATES PATENT OFFICE.

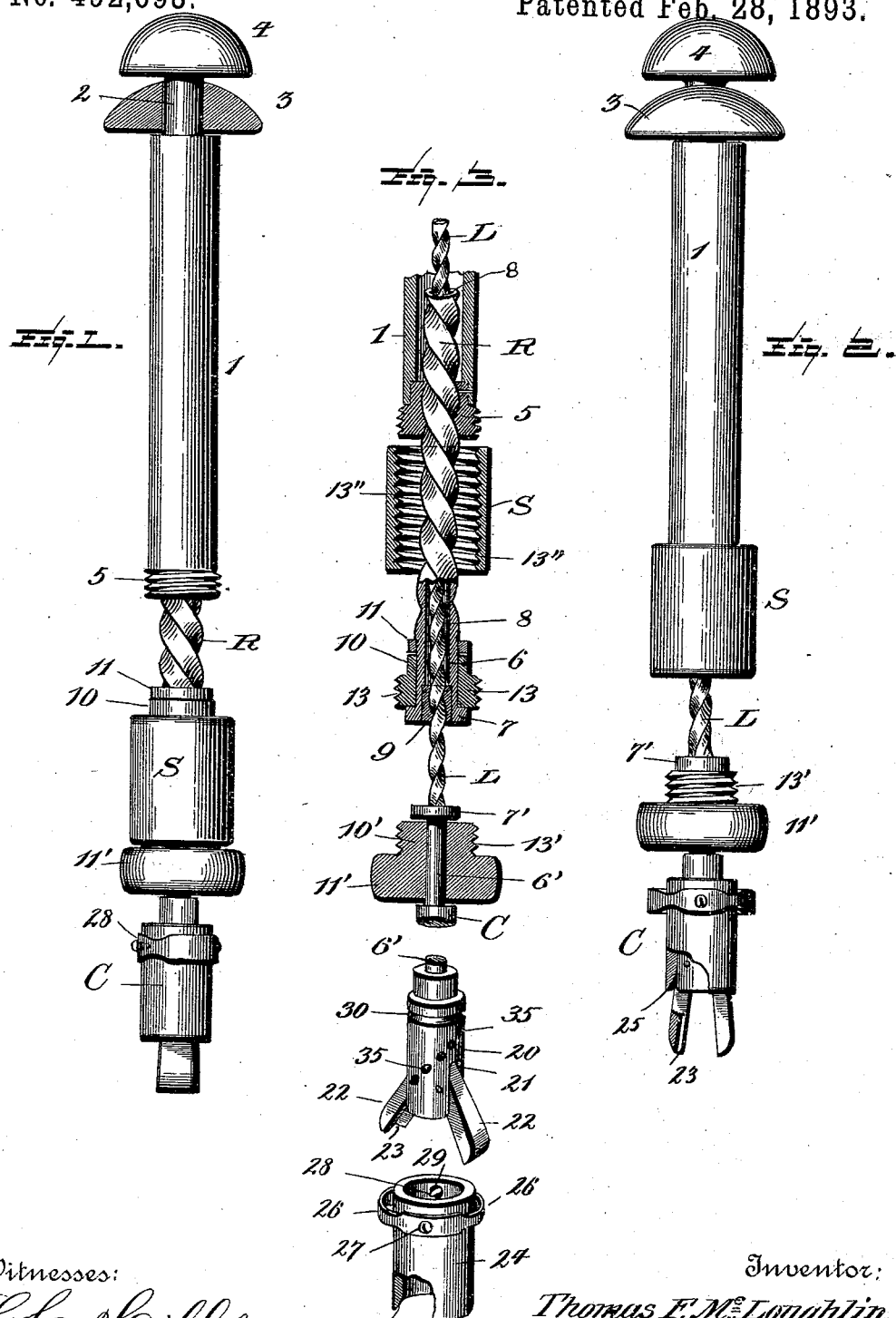

THOMAS F. McLOUGHLIN, OF LEAVENWORTH, KANSAS.

TOOL-DRIVER.

SPECIFICATION forming part of Letters Patent No. 492,693, dated February 28, 1893.

Application filed March 11, 1892. Serial No. 424,555. (No model.)

*To all whom it may concern:*

Be it known that I, THOMAS F. MCLOUGHLIN, a citizen of the United States, residing at Leavenworth, in the county of Leavenworth and State of Kansas, have invented certain new and useful Improvements in Tool-Drivers; and I do hereby declare the following to be a full, clear, and exact description of the invention, such as will enable others skilled in the art to which it appertains to make and use the same.

This invention relates to wood-working tools, and more espcially of that class thereof known as spiral tool drivers; and the object of the same is to effect certain improvements in tools of this character.

To this end the invention consists in a tool of substantially the construction hereinafter more fully described and claimed, and as illustrated in the drawings, wherein—

Figure 1 is a side elevation of this improved tool in position to turn its chuck to the right. Fig. 2 is a similar elevation ready to turn the chuck to the left, said chuck being here shown one-quarter turned from the position of Fig. 1. Fig. 3 is an aggregation of details of parts, some in elevation, some in section, and others in perspective, with their elements slightly separated.

Referring to the said drawings, 1 is the tubular handle having at its upper end a reduced extension 2 on which is swiveled a button 3, which the operator may grasp to draw the tool toward himself, while the outer end of said extension carries a rigid button 4 which is to be pressed on in using the tool. In the lower open end of this handle is a nut 5 threaded both interiorly and exteriorly—the latter threads being of the usual pitch, but the internal threads being quite steep.

R is what I shall call the "right-hand" screw because its use causes the tool proper to turn to the right. This screw takes into the threads within the nut 5 by which it is turned as the handle is moved longitudinally as the said nut is fast in the handle. At its lower end the screw R has a reduced extension 6 terminating in an enlarged head 7; and through this head and extension, and into the length of the screw R passes an opening 8.

9 is a nut secured within the head 7 and containing an internal thread of steep pitch adapted to take into the threads of the so-called "left-hand" screw L—also so styled because it turns the tool proper to the left. This screw passes up into the hollow body of the screw R as will be clear. Near its lower end the left screw L carries an enlarged head 7', below which is a smooth extension 6', and below that is in turn the chuck C—all rigid with this screw.

On the smooth extension 6 of the screw R turns loosely a collar 10—one end bearing against the head 7 and the other end against a washer 11 mounted on the extension against the lower end of the screw. The outer face of this collar carries a short length of thread 13... On the smooth extension 6' of the screw L turns loosely a collar 10' having secured thereto a knob 11' which bears against the chuck C while the upper end of the collar bears against the head 7'; and the outer face of this collar also carries a short length of thread 13'. The two threads 13 and 13' are of the same size and pitch as that on the exterior of the nut 5, and any or all of them may be engaged with the internal threads 13'' of a sleeve S—the latter being of sufficient length to engage all three of these threads when the tool is not to be used.

In operation, a tool-point is secured in the chuck C as will be understood, and the sleeve S screwed onto the threads 13. If it is desired the tool shall turn to the right, the sleeve is connected with the threads 13' whereby the left thread is practically done away with as it is locked to the sleeve. The operator then grasps the buttons with one hand and the sleeve with the other and draws them apart, at which time the handle 1 will turn to the right as the swiveled button 3 will easily permit. The tool-point is now applied to its work (as to screw home a screw), and—still holding the sleeve in one hand to steady the tool—the button 4 is firmly pressed upon. This causes the nut 5 to travel down the screw R whose threads really run to the left, and the result is that both screws and the chuck turn swiftly to the right within the two collars which are then fast within the sleeve... On the other hand, if it is desired the tool-point shall turn to the left, the sleeve is secured to the nut 5 and the threads 13—thereby practically locking the screw R to the handle and freeing the left screw L. The operation above described is now repeated, except that the lower hand grasps the knob 11' instead of the sleeve. The latter cannot move, whereas the knob can, and as it does move vertically the left screw (whose threads really run to the right) causes the chuck to turn the tool-point to the left as the tubular handle is brought toward the knob.

The employment of so many threads and screw-connections between the members of this device, prevents the use of a chuck which also employs threads to connect its parts; for if they were used, they might hold the point when turned in one direction, but release it undesirably when reversed. Hence I have provided the improved chuck best seen in Fig. 3 where it is shown with its parts separated, and the construction of this chuck may be described as follows: 20 is the body of the chuck which is bifurcated as at 21 at its lower end, and in this bifurcation are pivoted two jaws 22 with longitudinal notches 23 in their inner faces as usual in devices of this character. 24 is a collar or rather a sleeve surrounding the body 20 on which it slides and turns freely, and the lower end of this sleeve is beveled as at 25 so that it may bear properly on the outer faces of the jaws 22. Around the upper end of the sleeve is located an elliptical band spring 26, secured at one end of its lesser diameter by a rivet or screw 27 to the outer face of the sleeve; and 28 is a pin carried by the spring at the other end of said diameter and playing in a hole 29 through the sleeve. The spring in its normal position throws the tip of this pin through the sleeve into an annular groove 30 formed in the body 20 near its upper end, and the sleeve can then be turned but not moved longitudinally on the body. The latter is provided in its sides with several holes or cavities 35 at various distances from the groove 30. After the tool-point is inserted between the jaws, the operator places his thumb and finger upon the ends of the longer diameter of the spring 26 and pinches, whereby the pin 28 is moved radially out of the groove. The sleeve can then be pressed down on the body until the jaws are clamped upon the point, after which the pin 28 is brought over some cavity and allowed to sink into the same by releasing the pressure on the spring. This chuck I have found works perhaps better with the tool above described than any other employing threads or other means for clamping the jaws and which might loosen automatically as the tool was used; and hence I prefer to use the chuck so constructed in connection with the tool above mentioned.

What is claimed as new is—

1. In a tool driver, the combination with a screw having at its lower end a reduced and smooth extension, a head at the lower end of said extension, a tool-point connected with said head, and a handle having a nut moving on the screw said nut having exterior threads; of a washer mounted loosely on the extension against the lower end of the screw, a collar swiveled on the extension between the washer and head, exterior threads on said collar, and a sleeve having interior threads adapted to engage the exterior threads on the nut and collar, substantially as described.

2. In a tool driver, the combination with a collar provided with a head having a nut, means for turning said parts in one direction, a screw passing into said parts and threaded so as to be turned by the nut in the opposite direction when the collar is moved down thereon, a smooth extension on said screw, and a tool-point carried by its lower end; of a second collar turning loosely on said extension, a detachable and swivel connection between said collars, and a knob fast on said second collar, all as and for the purpose set forth.

3. In a tool driver, the combination with a hollow handle, a nut in its lower end, a right screw passing through said nut and itself having a nut, a collar swiveled on this screw, a left screw passing through the latter nut, a second collar swiveled on this left screw and having a knob, and a tool-point attached to the left screw; of a sleeve, and means substantially as described, for detachably connecting the sleeve with the two collars and the nut on the handle, as and for the purpose set forth.

4. In a tool driver, the combination with a hollow handle having a swiveled button near its upper end, a nut in its lower end having interior and exterior threads, a right screw passing through said nut and having a nut in its lower end, a left screw passing through this nut and into the right screw, and a tool-point attached to the left screw; of a collar swiveled on each screw at its lower end and having exterior threads, and an internally threaded sleeve adapted to engage the threads on said collars and the handle-nut, all as and for the purpose set forth.

5. In a tool driver, the combination, with a hollow handle, a right screw therein, a left screw taking into the right, and means for moving either screw longitudinally and axially; of a chuck comprising a body secured to the lower end of the left screw and bifurcated at its lower end, two jaws, pivoted in the bifurcation, the exterior of said body being annularly grooved near its upper end and provided with a series of cavities at various distances from said end, a sleeve surrounding said body, a spring-actuated pin in the sleeve and passing inwardly through the same, and means for withdrawing said pin partially, as and for the purpose set forth.

In testimony whereof I affix my signature in presence of two witnesses.

THOMAS F. McLOUGHLIN.

Witnesses:
G. E. SORRELL,
HENRY BRIGGS.